US012726483B2

(12) United States Patent
Demyon

(10) Patent No.: US 12,726,483 B2
(45) Date of Patent: Sep. 1, 2026

(54) SYSTEMS AND METHODS FOR A DATING PLATFORM

(71) Applicant: Social Facade, Inc., San Diego, CA (US)

(72) Inventor: Scott Michael Demyon, San Diego, CA (US)

( * ) Notice: Subject to any disclaimer, the term of this patent is extended or adjusted under 35 U.S.C. 154(b) by 221 days.

(21) Appl. No.: 18/544,564

(22) Filed: Dec. 19, 2023

(65) Prior Publication Data

US 2024/0212066 A1 Jun. 27, 2024

Related U.S. Application Data

(60) Provisional application No. 63/477,231, filed on Dec. 27, 2022.

(51) Int. Cl.
*G06Q 10/40* (2026.01)
*H04L 9/40* (2022.01)

(52) U.S. Cl.
CPC ........... *G06Q 10/40* (2026.01); *H04L 63/107* (2013.01)

(58) Field of Classification Search
CPC ........................................................ G06Q 50/01
See application file for complete search history.

(56) References Cited

U.S. PATENT DOCUMENTS 6,618,593 B1 * 9/2003 Drutman ............ G08B 21/0283 455/414.1
2006/0047825 A1 * 3/2006 Steenstra ............... G06Q 50/01 709/229
2008/0070593 A1 * 3/2008 Altman ................. H04W 4/029 455/457
2011/0137995 A1 * 6/2011 Stewart ................... H04W 4/02 709/205
2013/0316735 A1 * 11/2013 Li ........................... H04W 4/02 455/456.3
2014/0199970 A1 * 7/2014 Klotz .................... H04W 4/029 455/411

(Continued)

FOREIGN PATENT DOCUMENTS

WO WO-0022860 A1 * 4/2000 ............. H04L 67/52

OTHER PUBLICATIONS

Maja, “Key Features of Popular Dating Apps & Our Recommendations for Improvements” Feb. 12, 2021, https://web.archive.org/web/20210214120018/https://www.coderus.com/key-features-of-popular-dating-apps/ (Year: 2021).*

*Primary Examiner* — Jessica Lemieux
*Assistant Examiner* — Matthew Parker Goodman

(57) ABSTRACT

A system including one or more memories storing computer executable instructions and one or more processors. The one or more processors are configured to receive one or more dating preferences and location data from a first user, receive one or more dating preferences and location data from a second user, and receive an online status request from the second user. The one or more processors are further configured to generate and display an interactive map on the first user device, determine whether the first and the second users match based upon their dating preferences and their location data, and responsive to determining that the first and second users match and that the second user is online, generate and display on the interactive map a match icon indicative of the second user whilst maintaining the privacy of the second user.

19 Claims, 12 Drawing Sheets

(56) References Cited

U.S. PATENT DOCUMENTS

2014/0228060 A1* 8/2014 Abhyanker .......... G06Q 10/087
455/457
2016/0021153 A1* 1/2016 Hull ...................... G06F 16/337
715/753
2021/0082063 A1* 3/2021 Miller .................... G06Q 30/00

* cited by examiner

| User ID | Location | Last Update |
| --- | --- | --- |
| 91 | POINT (0 0 0) | 12/13/2022 4:24:16 AM |

| User ID | Location | LastUpdate |
| --- | --- | --- |
| 91 | POINT (-117.161649 32.7454 0) | 12/13/2022 4:23:28 AM |

| User ID | Location | Last Update |
|---|---|---|
| 91 | POINT (-117.161649 32.7454 0) | 12/13/2022 4:23:28 AM |

SYSTEMS AND METHODS FOR A DATING PLATFORM

BACKGROUND

The present disclosure relates to social networking platforms. More specifically, the present disclosure relates to systems and methods for providing and using a location-based dating platform.

Online social platforms have been around since the beginning of the modern internet. These consist of any electronic means for two or more people to engage in any interaction virtually using a computer or device connected to the internet. Dating platforms, also referred to as apps, have evolved this concept further to facilitate the basic human desire for connection and relationships. Dating platforms provide a digital meeting ground to help people meet, or "match", before they meet in real life. However, modern dating platforms miss the key to human interaction, which is human interaction.

The nature of online interactions exist without bounds to the physical world. Anyone can interact with anyone over a digital platform, and not know if they are sitting next to one another or on the other side of the world from one another. This provides a very good level of physical safety that moderately protects someone of any sort of crime that would require the offending individual to be at the same physical location of their victim. As digital platforms are evolving, more personally identifiable information (PII) is being transferred over the platforms that can be used or exploited by an offending party. Unfortunately, PII can be exploited or used to commit a crime toward a specific individual. For example, one such piece of information is the physical location of users on a platform. Such location data can be useful to the platform and users thereof; however, it removes the natural layer of protection during most online interactions.

SUMMARY

This invention is designed to facilitate additional safety and privacy while using location data of users on the platform. This invention allows users to view potential matches on an interactive map without disclosing the real time location of users and whilst maintaining the privacy of users as they travel about the real world. The users can also view user generated content in feeds displayed on the map, wherein such feeds are associated with a particular location at which others users are presently located.

According to an embodiment, a system includes one or more memories storing computer executable instructions and one or more processors that, when executing the computer executable instructions, are configured to receive one or more dating preferences associated with a first user. The one or more processors are further configured to receive location data of a first user device associated with the first user, receive one or more dating preferences associated with a second user, receive location data of a second user device associated with the second user, receive an online status request from the second user, generate and display an interactive map on the first user device, determine whether the first and the second users match based upon their dating preferences and their location data, and responsive to determining that the first and second users match and that the second user is online, generate and display on the interactive map a match icon indicative of the second user whilst maintaining the privacy of the second user.

According to another embodiment, a method includes receiving one or more dating preferences associated with a first user, receiving location data of a first user device associated with the first user, and receiving one or more dating preferences associated with a second user. The method further includes receiving location data of a second user device associated with the second user, receiving an online status request from the second user, generating and displaying an interactive map on the first user device, determining whether the first and the second users match based upon their dating preferences and their location data, and responsive to determining that the first and second users match and that the second user is online, generating and displaying on the interactive map a match icon indicative of the second user whilst maintaining the privacy of the second user.

According to another embodiment, there is provided a non-transitory computer-readable medium containing computer executable instructions that, when executed by one or more processors, cause the one or more processors to perform a method. The method includes receiving one or more dating preferences associated with a first user, receiving location data of a first user device associated with the first user, receiving one or more dating preferences associated with a second user, receiving location data of a second user device associated with the second user, and receiving an online status request from the second user. The method further includes generating and displaying an interactive map on the first user device, determining whether the first and the second users match based upon their dating preferences and their location data, and responsive to determining that the first and second users match and that the second user is online, generating and displaying on the interactive map a match icon indicative of the second user whilst maintaining the privacy of the second user.

BRIEF DESCRIPTION OF THE DRAWINGS

The embodiments illustrated herein are not limited to the precise arrangements, sequential steps, and dimensions shown. Like numerals indicate like elements throughout the drawings. In the drawings:

FIG. 4 is a flow diagram of a method for generating a user's privatized, non-real time location on the map.

FIG. 11 is a flowchart of a method for generating feeds on the map.

DETAILED DESCRIPTION

The system 100 of the invention facilitates more human interaction in dating, or in general connecting people in the real world, by connecting users based on their desired preferences, their location, and places of interests, such as restaurants, parks, businesses, or other gathering places. Furthermore, the system 100 protects the privacy of the users and maintains the anonymity of the real time location of the users, therefore keeping the user unidentifiable to potential offenders nearby or in other parts of the physical world.

Figure 1:
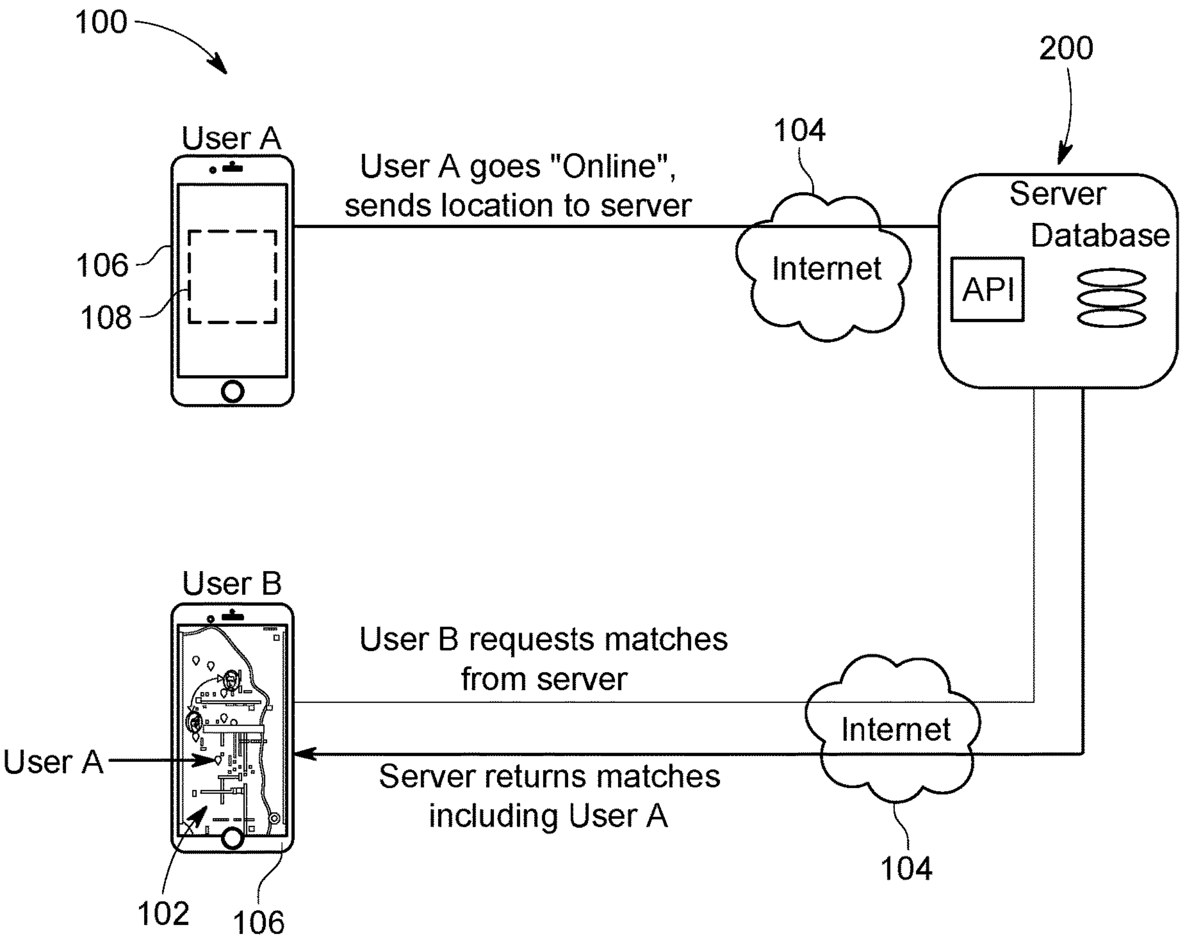
FIG. 1 is a schematic diagram of a system for connecting people in the real world using an interactive map.

The system 100 provides a matching service, an interactive map 102, a suggested dialogue subsystem which calculates and offers topics of commonality, and a notification communication subsystem. The system 100 generally comprises a network 104, user devices 106, and a server 200 connected to the devices via the network 104. The system 100 may comprise a dating application 108 which is downloadable onto the one or more user devices 106, as shown in phantom in FIG. 1. It is conceivable that in other embodiments, the system 100 may include different or additional elements from what is illustrated in FIG. 1.

The network 104 can be any type of communications network, such as a local area network (LAN), wide area network (WAN), a public network such as the internet, and/or some combination thereof. In general, communication between the various devices and systems may occur via any desired network interface using any type of wireless connection, using a variety of communication protocols (for example UDP, TCP/IP, HTTP, S1v1TP, FTP), encodings or formats (for example HTML, JSON, XML), or protection schemes (for example VPN, secure HTTP, SSL).

Each user device 106 may include input/output devices, e.g., a display screen, lights, and speakers, a local data storage, one or more sensors, one or more applications, one or more application programming interfaces (APIs), and/or a notification module for communicating with the server 200 via the network 104. Each user device 106 may further include the application of the server 200. Each user device 106 can display the interactive map 102 generated by the server 200. The devices 106 may also include other components known to those skilled in the art. Therein, the devices 106 may include any desired hardware and/or software for generating user data.

The user devices 106 may or may not be identical to one another. Each user may have one or more devices 106 that may be stationary, portable, and/or wearable. The devices 106 can be in the form of smart devices. The devices 106 may be in the form of a computer, a smartphone, a tablet, a navigation system, a handheld GPS system, user equipment (UE), a portable gaming device, a media user head-mounted display (HMD), a virtual, augmented, and/or mixed reality device, such as a headset or glasses, smart glasses, smart clothes, smart shoes, data gathering implants, and/or or other suitable data gathering electronic devices. The user devices 106 may or may not be identical to one another. By way of example only, one user may have a smartphone 106 and a wearable device 106, such as a smartwatch, that is connected to the smartphone 106 and/or the network 104. It should be appreciated that the user may only have a smartphone 106, have both smartphone 106 and wearable device(s) 106, or just a wearable device(s) 106 only.

The one or more sensors, integrated within the device 106, may include a location sensor, in the form of a timekeeping device, a positioning device, a speed sensor, an accelerometer, a gyroscope, an altimeter, a pedometer, a heart rate sensor, and/or a camera. For instance, the positioning device may monitor the position of the smartphone and/or wearable device 106. The one or more sensors may include other and/or additional sensors as appreciated by the skilled artisan.

The positioning device can be any device or circuitry. For example, the positioning device may comprise a GPS system, a Galileo positioning system, a Global Navigation satellite system (GLONASS), a BeiDou Satellite Navigation, or a Positioning system. As the user moves around with the device 106 in the physical world, the positioning device can track the position of the user and provide user location data to the server 200.

The application 108 may monitor and collect user data. The application 108 may comprise part of the device's operating system and/or additional software installed by the user. The application 108 may or may not include a data collection module. The application 108 may or may not retrieve data from other systems and/or applications on a device.

Figure 2:
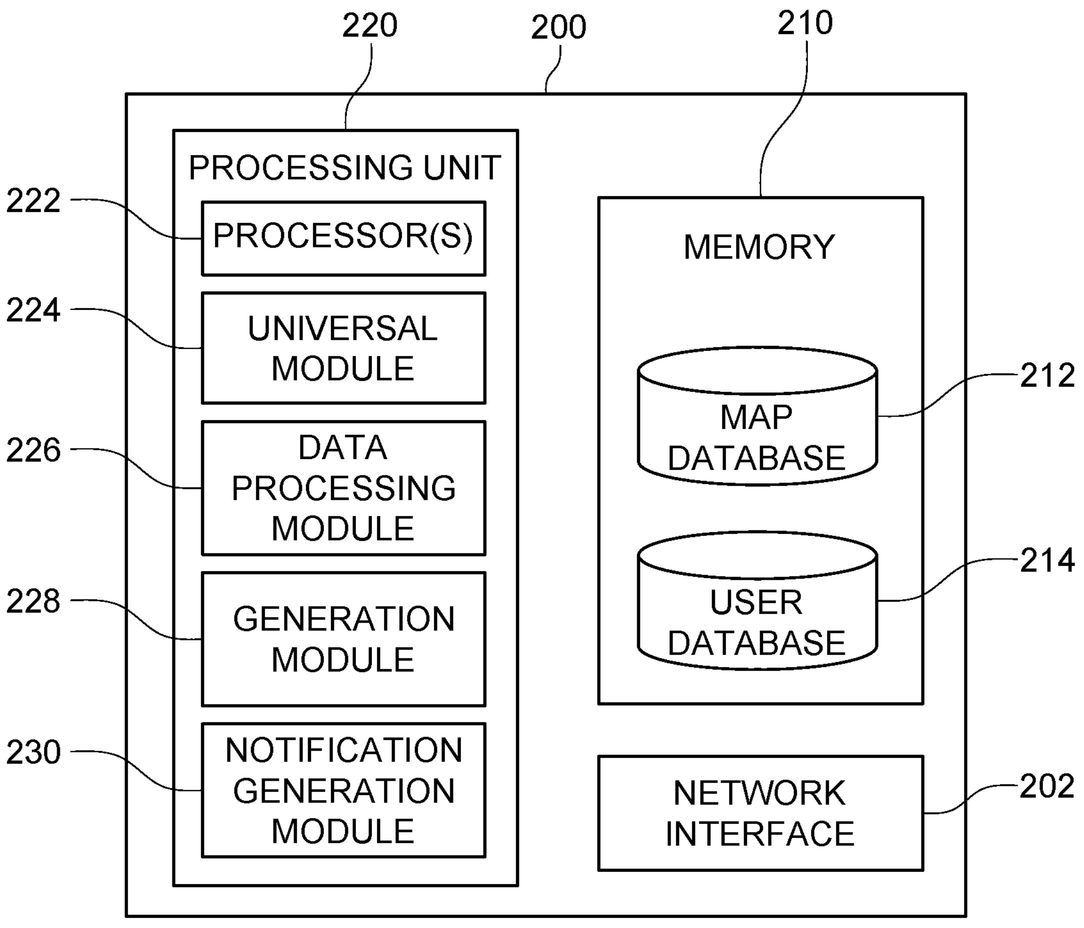
FIG. 2 is a schematic diagram of the server of the system.

Referring now to FIG. 2, the server 200 is configured for intaking and processing data from the devices. The server 200 may include a network interface 202, a computer-readable storage media 210, such as a memory, and a processing unit 220. In some embodiments, the server 200 may contain different or additional elements, and the various functions thereof may be distributed among its various elements in a different manner than described herein.

The network interface 202 establishes communication between the server 200 and the network 104. The network interface 202 can include any suitable components for interfacing with one or more networks, including, for example, transmitters, receivers, ports, controllers, antennas, or other suitable components.

The memory 210 stores map data, user data which may be inputted by the user or sensed by the user devices 106, including user characteristics, dating preferences, privacy preferences, and other data. The memory 210 may generally include any suitable computer readable media, transitory or non-transitory, for storing instructions. In some embodiments, the memory 210 may include a map database 212 and a user database 214. The databases 212, 214 may be part of the same server 200 or separate from the server 200 and accordingly be remotely accessed through the network 104. In some embodiments, the memory 210 may include a single database which stores all necessary data.

The processing unit 220 generally includes one or more processors 222 for executing computer-readable instructions. One or more of the processors 222 can be an AI processor 222. The processing unit 220 may further include a universal module 224, a user data processing module 226, a generation module 228 for generating the GUI and the map 102 displayed on the devices, communication platforms, and digital elements, such as various match icons, feed icons, and overlays displayed over the map 102, etc., and a notification generation module 230. The processing unit 220 generates the interactive map 102, which allows users to view and interact with one another.

The one or more processors 222 may perform the various functions of the processing unit 220 described herein. In one embodiment, the processors 222 may comprise an artificial neural network using a machine learning algorithm. The artificial neural network can be trained using a training module which was trained on match criteria, image data, image processing, and location and travel data from previous users. The training module can be implemented in hardware, software or a combination of hardware and software. The training module may be stored in the memory 210 or externally and accessed by the server 200. In one embodiment, the AI processor 222 may automatically calculate user identity markers, preferential markers, past and/or future location data, match identifiers, and proximity overlaps between regional geofences.

The universal module 224 hosts and generates content for the users. The universal module may generate and update the map 102, establish and facilitate communication between users, and conduct various verification processes to verify the locations of users. The universal module 224 may also govern device connectivity and the security thereof. It is noted that the user data processing module 226, the generation module 228, and/or the notification generation module 230 can be a part of or separate from the universal module 224.

The user data processing module 226 may receive user data associated with various characteristics of the users, dating preferences of the users, and sensed data relating to the locations and speeds of the users. The data processing module 226 may determine the matches among users. The data processing module 226 may determine whether the user is stationary, walking, or traveling by a mode of transportation, which can subsequently be used to determine and set the online status of the users, as discussed in more detail below.

The generation module 228 is configured to generate the map 102 and the various icons and overlays thereon, as discussed in more detail below. The generation module 228 can also generate feeds of user uploaded content. The generation module 228 may also generate various other virtual or digital elements. Such virtual elements can be viewed as part of the map 102, an AR, and/or a VR experience. The virtual element generated can be an icon, a symbol, an avatar of the user, a profile, a digital object which may or may not be associated with the user's avatar, a group or category icon, or a media display comprised of user generated content and/or content uploaded by other individuals associated with a particular point of interest.

The notification generation module 230 is configured to generate one or more notifications for each user. The notification generation module 230 may generate one or more virtual, audio, and/or, visual notifications. The notification generation module 230 may generate a notification in real time. The notification generation module 230 may generate a notification depending upon user data and/or the user's sensed location or activity. A notification may include a prompt for further action, such as allowing one or more other users to view additional information about them, a prompt to travel to a particular location, a prompt to go online or offline, or a prompt to view matches on the map 102.

Referring collectively to FIGS. 1-7, in operation, when a user joins the system to become a member, various pieces of user information are collected and stored in the memory 210, including but not limited to the user's email address, first name, photo, e.g., Facebook® photo, and identifier, such as an Apple® identifier. Users can also input user information as desired, such as a user's dating preferences, their gender identity, relationship status, and which gender identities, if any, they are seeking in a potential match. These values are stored in a SQL database table as an integer value where "male" is stored as the number 1, female is stored as the number 2 and so on in the "Matchributes" database table. Every value stored in this table has an associated MatchributeTypeID, which determines the classification of what that value represents. A MatchributeTypeID of "1" represents what gender identity the user is looking for in a match. Dating preferences may include information regarding gender identity, age, physical characteristics, personality traits, organizations, clubs, education, hobbies, politics, etc.

The server 200 can automatically determine personally identifiable information (PII) using machine learning. The user may upload a photo and one or more AI processors 222 may determine various characteristics, such as eye color, hair color, biological sex, etc. The server 200 can automatically determine characteristics from the users' photos, which can be presently visible or hidden from other users. The user may be prompted to upload numerous photos of themselves, their pets, their favorite travel destinations, etc., and the server 200 may calculate compatibility based upon these photos, regardless of whether the photos are hidden or not. The server 200 may additionally automatically determine the physical location of the user and/or the physical location of the various photos uploaded by the user. Thus, the server 200 may automatically identify commonalities in residencies and/or travel locations.

The server 200 may also automatically suggest changes to a user's selected preferences. For example, the server 200 may suggest a match and/or a change in the user's preferences based upon various characteristics which may or may not be in opposition to the user's identified preferences. For instance, the server 200 may suggest a change in gender preference, or non-gender preferences, based upon various calculated markers, including potential matches which would otherwise not be communicated to the user but for a limitation on gender identity and/or sexual preference. Additionally, the server 200 may suggest a match in a differing location, which may be outside of the user's proximity preferences, if other various characteristics are highly agreeable. Thereby, the user may see and/or be offered opportunities to change their preferences based upon calculated commonalities to other users.

Figure 3:
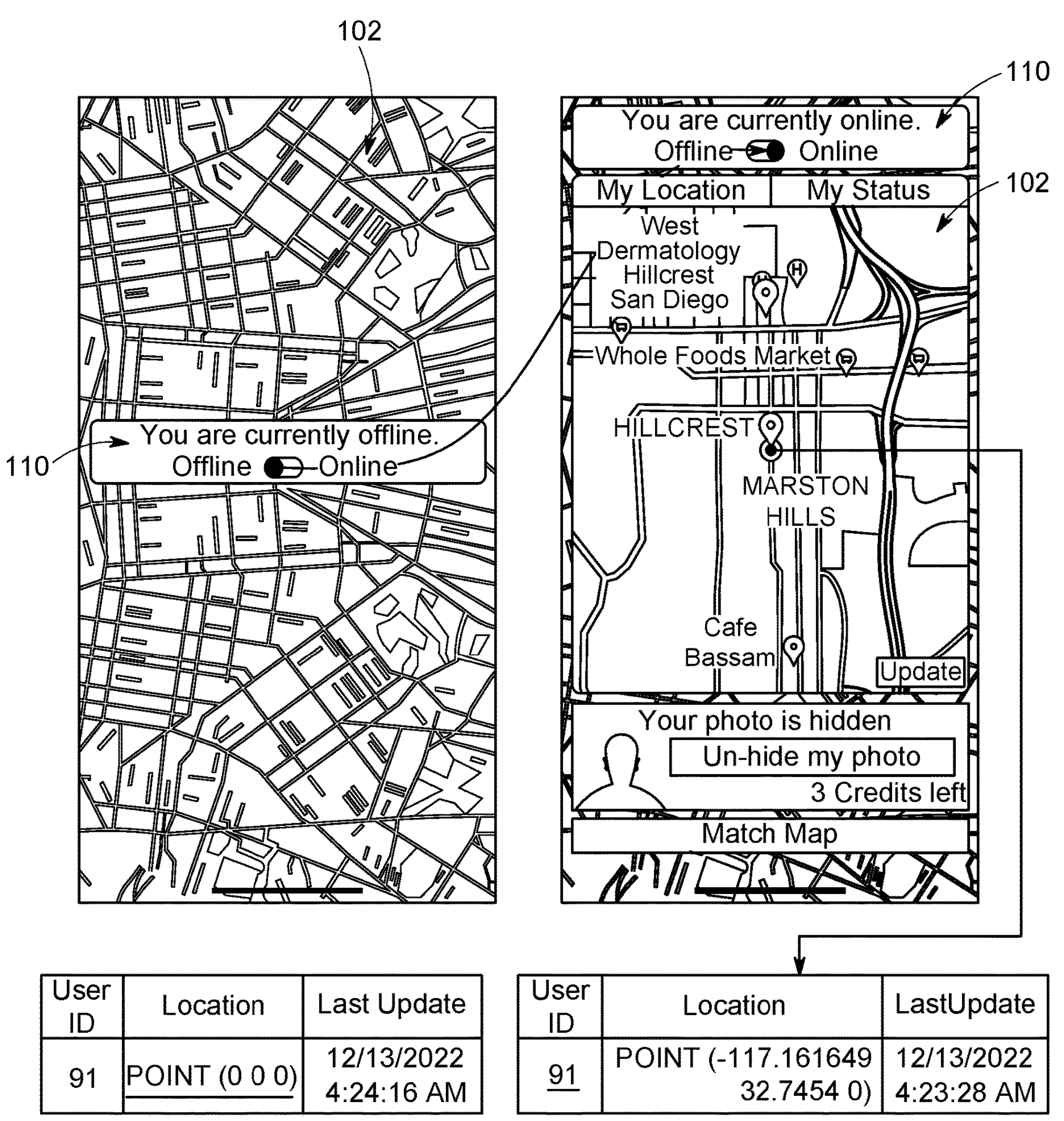
FIG. 3 is a flow diagram illustrating a method of longing online and using the map.
Figure 4:
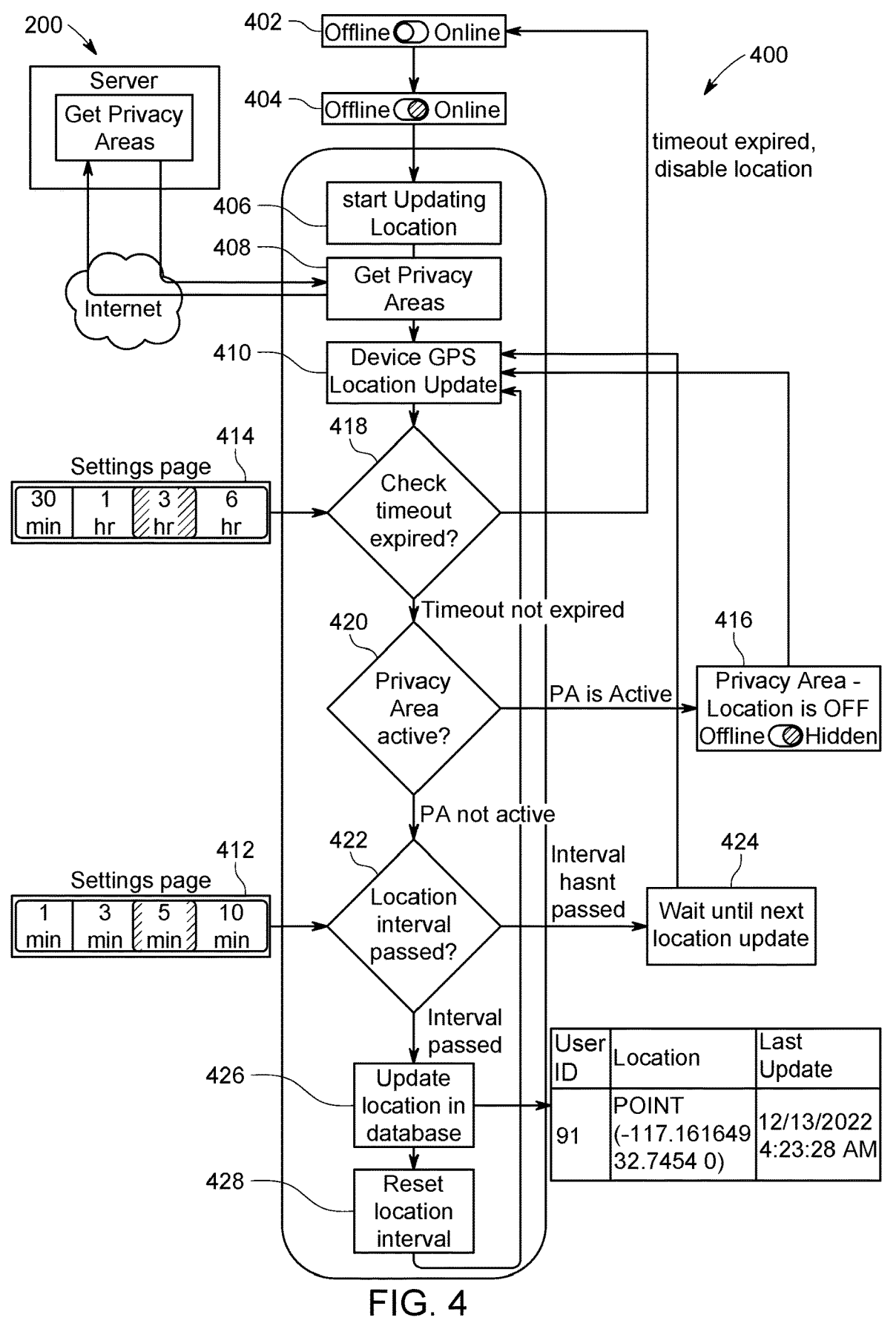

Referring specifically to FIG. 4, there is shown a flow diagram of a method 400 for generating a user's privatized location on the map 102. At block 402, once signup is complete, the server 200 generates and displays an online overlay 110 on the interactive map 102 wherein the user can input whether or not they wish to "go online" and accordingly allow the server 200 to make the user visible to other users within the interactive map 102 (FIG. 3). Such a selection can occur in an initial home page which is displayed before the user can use the map 102 and view others on the map 102. Additionally or alternatively, the user can view potential matches on the interactive map 102 whilst being in a hidden mode if the user is in a privacy area. At block 404, a user can select to go online via the online overlay 110 and the server 200 can receive the online status. At block 406, the server 200 initiates a background service that calls a backend API, which in turn passes the users current location (latitude, longitude and altitude) to the server 200 as provided by the location sensor of each user device 106. Therein, the server 200 receives the exact location of the user device 106. This location is logged in a table with the associated users ID, and a timestamp is logged to track the last time the location was updated. At block 408, the server 200 will retrieve any previously determined privacy areas associated with the user. The server 200 can then identify and update the map 102 accordingly. Therein, the server 200 can generate a privatized location of the user device 106 based on the location of the user device 106 and the privacy area data. Then, the server 200 can generate a match icon and accordingly place the icon on the map 102. At block 410, the server 200 can update the location of the user device 106 based on a time interval, a master time limit, the location of the user, the privacy area(s), travel status of the user, i.e., whether the user is traveling from one location to another or staying at a particular location, event or business data, and a speed of the user. For example, while the user remains online, the server 200 can continue to send a location update based on a desired time interval value. The user can input a desired time interval for how often the server 200 updates their location on the map 102 (at block 412). The user can also input a master time limit after which the user's status is turned offline so that they are no longer visible on the map 102 (at block 414). The user can further input whether or not they wish to have their location hidden at any predetermined privacy area (at block 416).

In some embodiments, the server 200 can automatically calculate the time interval to query and update user location and/or the master time limit which sets the maximum time limit the user remains visible on the map 102, based on user location, travel status, travel speed, event or business data, privacy area(s), and/or user input. In some embodiments, an update will only be sent to the server 200 if the user has moved outside of a 20 meter radius from the previous location update. Location updates can also be bound to the master online timer, or maximum time limit, where once the timer expires, the location updates will stop automatically, and the user will no longer appear as "online" to other users. Their location pin or icon is no longer viewable on the map 102 of other users. At block 418, the server 200 will determine whether or not the master time limit has been reached. If expired, the server 200 will automatically turnoff the online status such that the user is no longer visible on the map 102. If the master time limit has not been reached, at block 420, the server 200 will determine whether the privacy area is active and if the user is presently within the privacy area. If the user is within an active privacy area, the server 200 will automatically turnoff the user online status. If the user is not within an active privacy area, at block 422, the server 200 will determine if the location time interval has passed. If the update interval has not passed, at block 424, the server 200 will wait to update the map 102. If the update interval has been reached, at block 426, the server 200 will update user location in the database and on the map 102. At block 428, the server 200 will reset the update location time interval and the method 400 will repeat at block 410, wherein the server 200 receives the user location data from the user device 106.

The server 200 increases the enjoyment of the dating process without sacrificing user privacy. The user device 106 may send its location data to the server 200 at given intervals; however, the server 200 will not update the map 102 with the user's real time location. Before the server 200 updates a user's location, the server 200 will determine whether the user is within the privacy area, is within the master time limit, relatively stationary (e.g., did not move beyond 20 meters from the prior location update) and not in transit to another location, and whether the predetermined update time interval has been reached. Additionally, generating and showing a non-real time user location on the map 102 accordingly prevents other users from knowing the exact, real time location of a given user. Furthermore, a user's non-real time location will be automatically hidden from the map 102 if and when a user starts to travel, e.g., when a user's speed exceeds 3 mph/hr (0.8 km/hr), or upon entering their privacy areas, thus other users cannot see or identify the user in transit or at a private location, e.g., their home or even in transit toward their home. Once the user is stationary again, the server 200 will determine the location of the user, wait for the online time interval to pass, recheck the location, determine that the user has not traveled a significant distance away from their previous location in between time intervals, and lift the travel mode allowing the user to be online and accordingly seen by other users on the map 102. Still further, if server 200 was hacked by a wrongdoer, the data stolen would not reveal the exact location of the user or the exact location of the privacy. Therefore, the server 200 adds additional layers of privacy to dually help safeguard the user and make the dating experience more enjoyable. In other words, in one embodiment, to be visible to other users as potential partners, the user must be out of their privacy area and enjoying a particular activity at a particular place; thus, interjecting more humanity and human interaction in the dating experience without sacrificing the privacy of the users.

Figure 5:
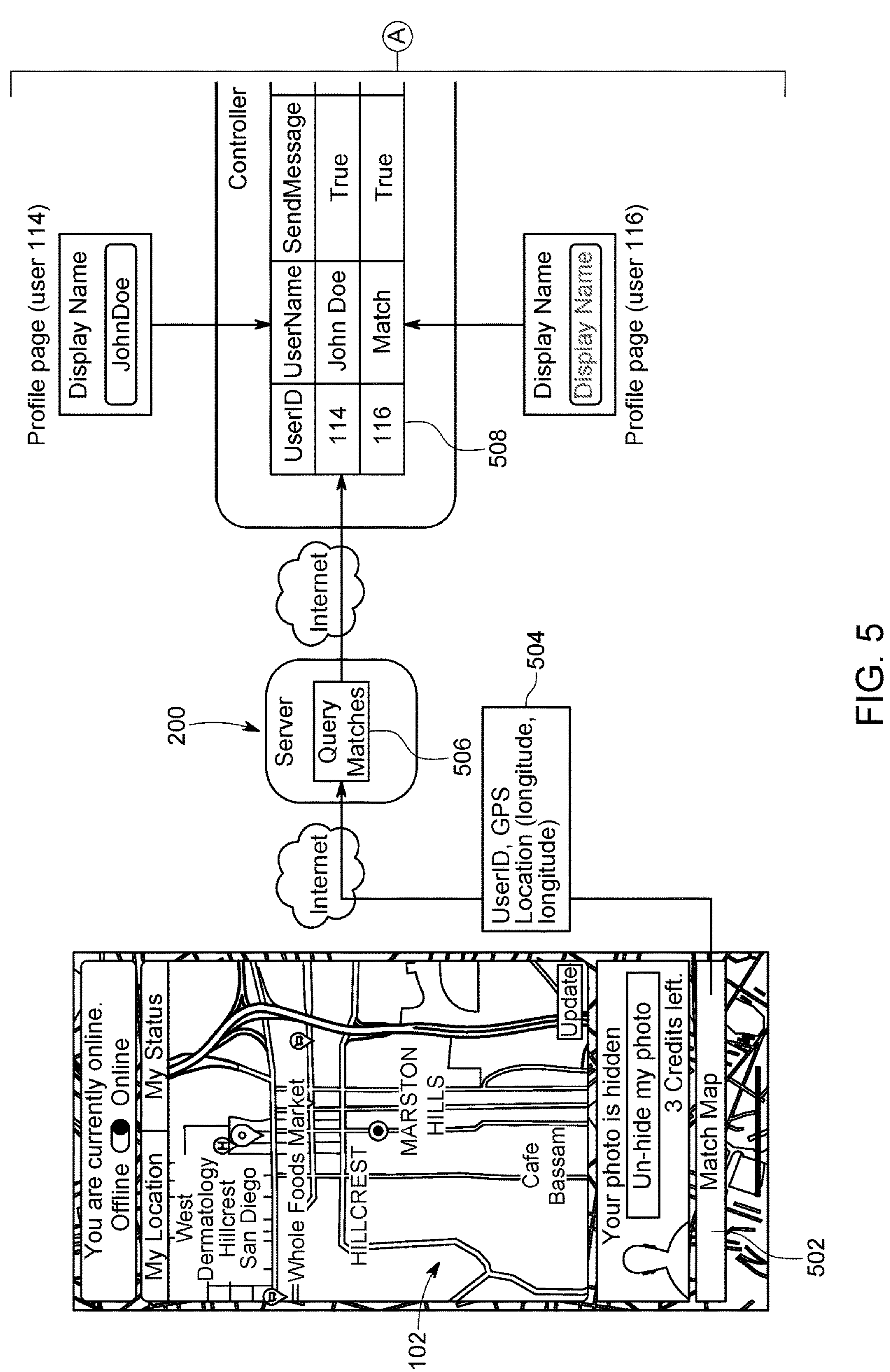
FIG. 5 is a flow diagram of a method for matching and displaying potential dating partners on the map.
Figure 5:
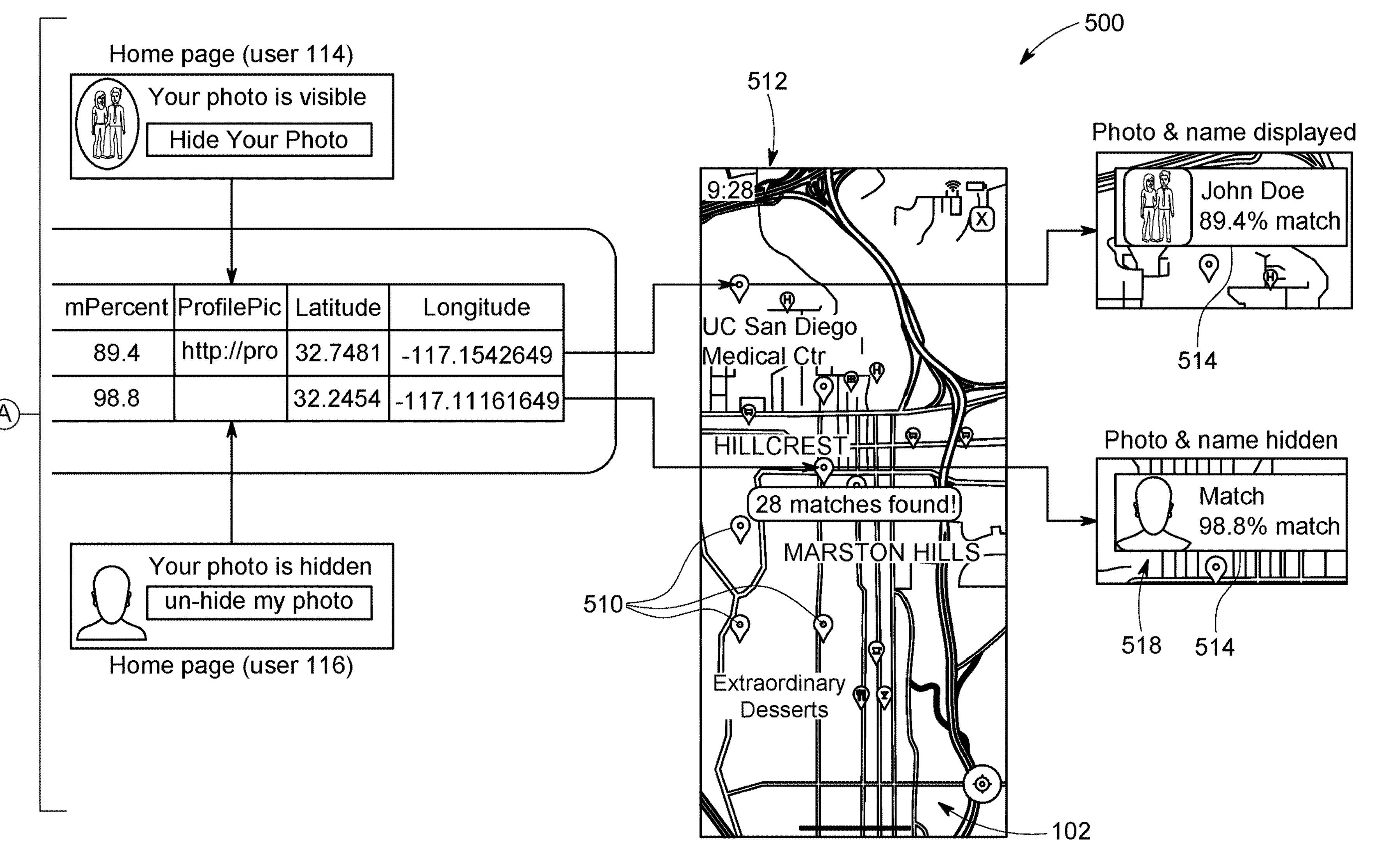

Referring to FIG. 5, there is shown a flow diagram of a method 500 for matching and displaying potential dating partners on the map 102. While online, users can view a map 102 of other users who are also online in their same physical location or general region. For example, a user can select to see the map 102 via a match map icon 502 and/or the map 102 may be automatically generated and displayed upon the user selecting to go online. When the map 102 is initialized, the users ID and current location are sent to the backend server 200 (at block 504), which runs a query (at block 506) to find all matches of those users who are also online and within a specified radius of the current location received from the user device 106 of that particular user. This query performs the search to locate anyone who matches with the specific criteria set within the user's preferences, while also ensuring the matched users search preferences are taken into consideration when returning the results. Hence, in one embodiment, all users that match must also currently be online, ensuring their location is within the limits specified by the original location passed in to the query. Users who have blocked other users will accordingly have such matches filtered out and not returned in the results. Every user timestamp record which is associated with their location is verified to have had an update within the last 30 minutes or they are also filtered out of the results as a safety backup.

Every user that results from this search query has a match percentage calculated to indicate how well they match with the original user overall, based on the commonalities and preferences both users set forth in their match criteria and physical profile. When two users are evaluated by the backed to determine if they are a "match", the server 200 calculates a value for how well user A matches with user B. For example, if user A specifies their political preference is "Liberal" and they are seeking a match that is "Liberal" but user B has specified they are "Conservative", then these two users would have a 50% political match score. The rest of the match preferences are calculated this way, and a final match percentage is then calculated using a combination of the calculated percentages to define an overall match percentage. All of these percentages are displayed to the respective users who are returned as a match to the original user.

Once the server 200 generates a listing of the matches, the server 200 will send matches to the user device 106 via the application 108 (at block 508). Then the server 200 will notify the user of and display the matches on the map 102, with a corresponding match icon 510 which may or may not be identical to one another (at block 512). The match icons 510 are indicative of the non-real time location of the other users who are out in the real world and outside of their respective privacy areas. Hence, the match icon 510 is indicative of an approximate location of a user, and more particularly a non-real time approximation or non-real time location of a given user. The match icon 510 is configured to ensure that an exact real time location of the user is not displayed on the interactive map 102 or otherwise provided to other users in order to maintain the privacy of the users. The server 200 will also generate one or more matched overlays 514, 516 for a given match and display the overlay on top of the map 102 (at block 518). In generating and displaying the match icons on map 102, the server 200 can wait for one location update time interval before displaying the match icon of users, upon the users initially going online. Thereby, the server 200 introduces a lag time to ensure that the user is not traveling and also ensure that the user's real time location is not displayed on the map 102. Thus, the match icon 510 of each user can illustrate a non-real time location and a match likelihood between paired users.

The match overlay 514 can display the name, the likelihood of the match and why, and the photo of a given matched user. Additionally, the server 200 can generate and display a hidden match overlay 516, wherein the name and photo of the matched users are hidden but the likelihood of the match is displayed. The hidden match overlay 516 is unique in that it allows users to travel to find non-real time locations of potential partners, via the icons 510, without specifically identifying the matches with PII (such as their name, photo, or other physical characteristics). Thereby, the user is guided to a particular location at which a potential match will be present, but the user will not know exactly who the potential match is, which accordingly allows the dating experience to be more natural, more personality driven, and allows relationships to grow more organically.

The server 200 can also toggle whether or not the user's name and photo(s) may be displayed, based on a master time limit, a user input, an in-platform incentive or token, and/or whether the user is online. For example, the server 200 may automatically hide or unhide a user's name and/or photos upon the user becoming online. Upon determining that another user has clicked on this particular user's match icon 510, the user may be prompted to share their name and/or photos. The user may then input a corresponding input command to either share or not share their name and/or photos. If the user allows their information to be shared, then the other user will be shown this user's name and/or photo, for example as shown in the overlay 514. If the user does not allow their information to be shared, then their name and/or photos will remain hidden, and the other user may be shown the hidden overlay 516. The server 200 may allow the additional information to be visible to other users for a set duration of time and/or unless and until the user decides to go offline. The server 200 may also automatically stop sharing the user's name and/or photo after a master time limit, such as a 24 hr time limit. If the user goes offline, via user input or the server 200 itself, then the server 200 will also stop the sharing of the user's name and/or photos. At any time while the user is online, the user has the option to un-hide their photos to be displayed on their match detail page to any other user who clicks on their respective location pin on their match map 102. This call to the server 200 changes a "HidePhotos" flag from true to false. This in turn allows any other matched user to view the user's photos while this flag is selectively set to false by the user. If the user decides to hide their photo, a backend call is made to set the "HidePhotos" flag back to true. Thereby, the server 200 increases the privacy of its users by not allowing others to access more personal information unless and until such information is shared by a given user.

Figure 6:
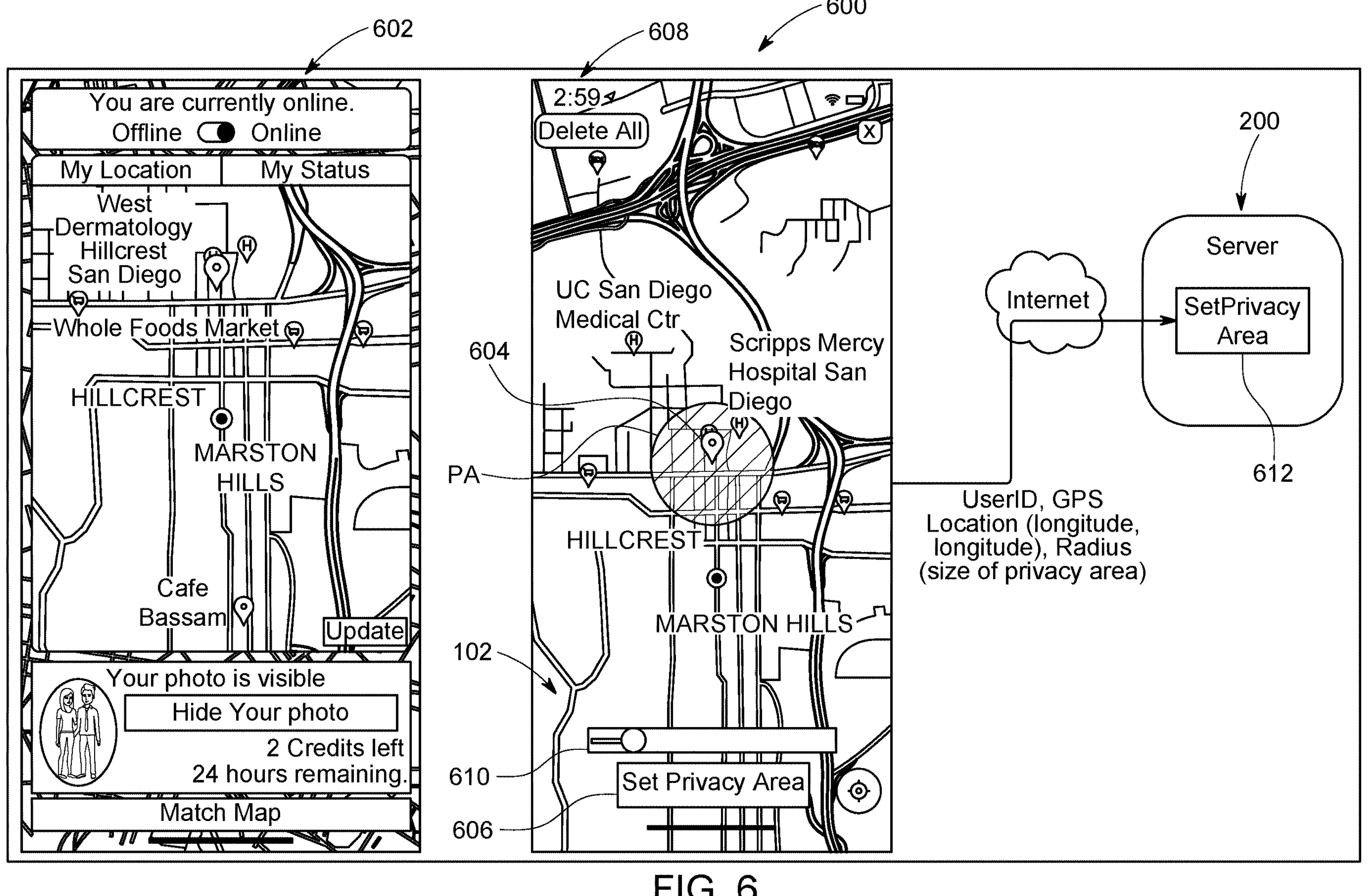
FIG. 6 is a flow diagram of a method for generating one or more privacy areas to protect the privacy of the user.
Figure 7:
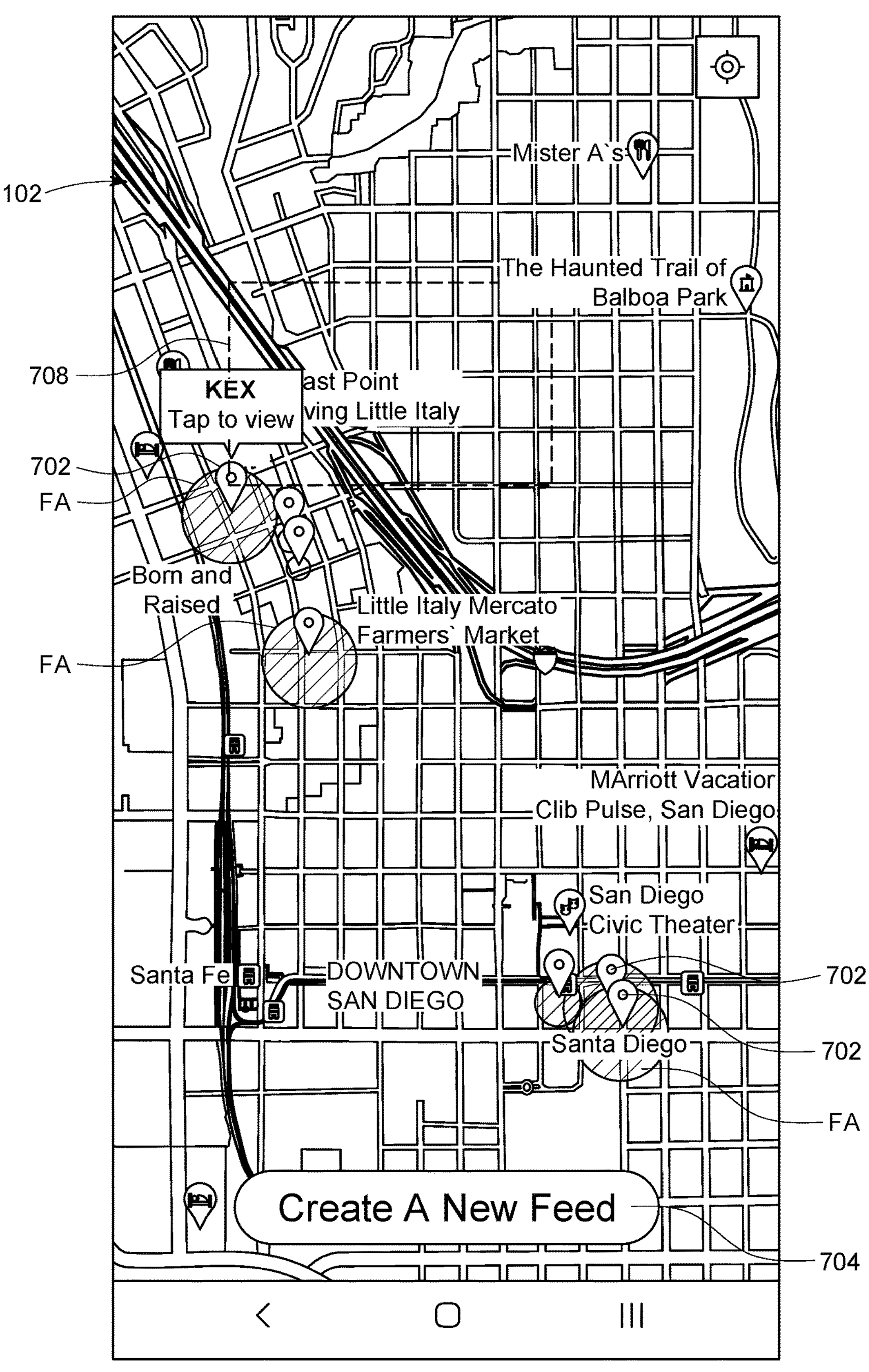
FIG. 7 is a schematic diagram illustrating feeds on the map.
Figure 8:
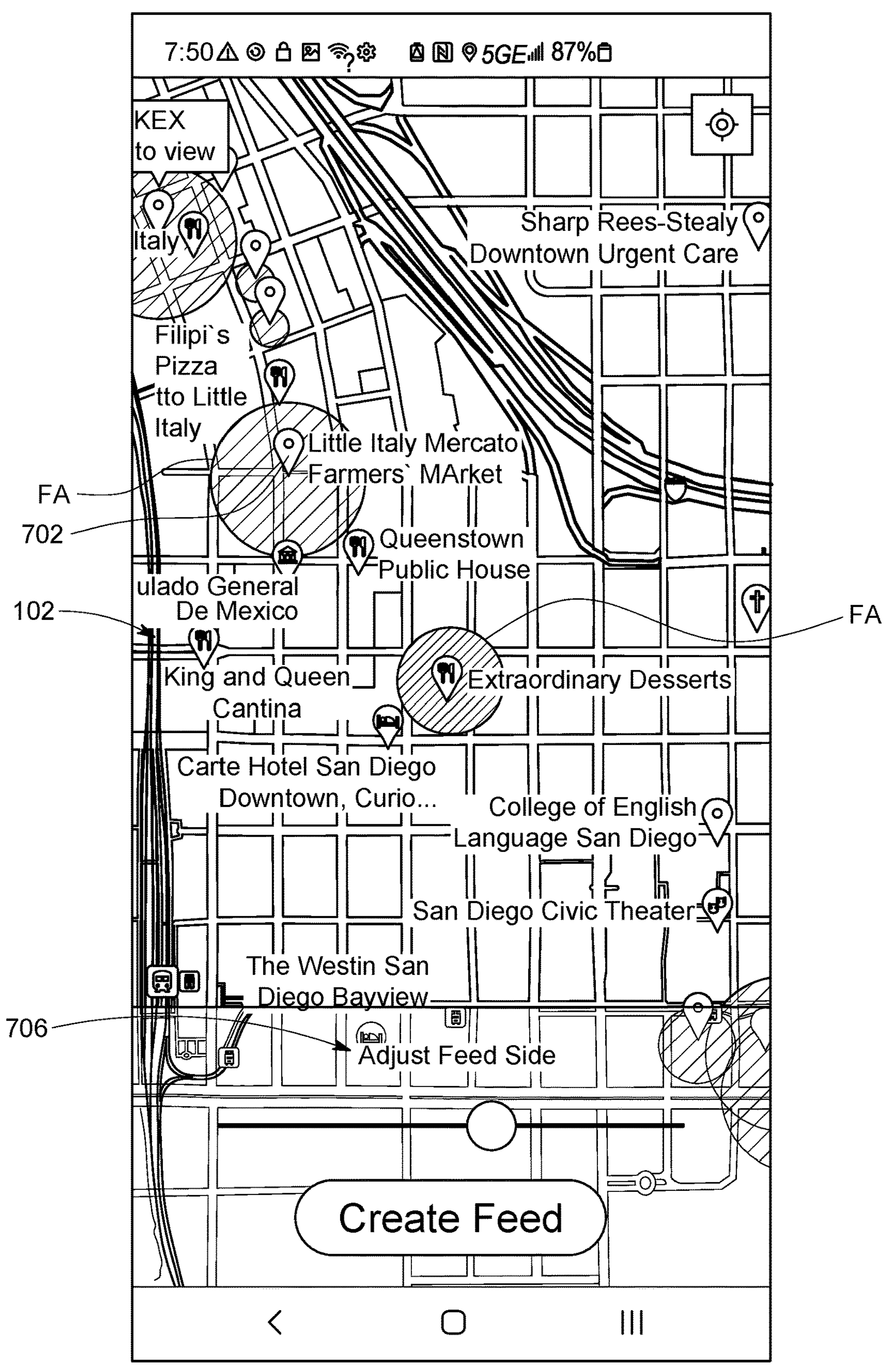
FIG. 8 is a schematic diagram illustrating the creation of a new feed by the user inputting a location and size of a feed area geofence.

Referring to FIG. 6, there is shown a flow diagram of a method 600 for generating one or more privacy areas to protect the privacy of the user. Initially the user may not have a designated privacy area upon going online on their map 102 for the first time (at block 602). The server 200 and/or the user can determine and set a privacy area geofence PA, wherein their location will be hidden. More particularly, the server 200 will stop updating the map 102 with any subsequent location updates, upon determining that the user is traveling and/or upon entering the privacy area geofence PA. For a user to set their own unique privacy area geofence, the server 200 can prompt the user to place a privacy pin 604 on the map 102 via a privacy map button 606 (at block 608). Alternatively, it is conceivable that the user can input a physical address. The user may place the privacy pin 604 and thereafter manipulate a slider overlay 610 to increase or decrease the size of the privacy area geofence. The server 200 thereafter will receive and store the privacy area geofence (at block 612).

A user can set as many privacy areas PA as they want by moving the center location of the map 102 to the desired location of the privacy area PA, then adjust the size (radius) of the privacy area PA. The created privacy area PA is uploaded to the server 200 and stored in a database table with the user ID and the location and the radius of the privacy area PA. When the background service is running (user is online), the server 200 will make a call to the database on every location update to retrieve all stored privacy areas of the user. The server 200 then checks to see if the current location is located within (inside) of any privacy areas PA defined by the user. If this is not the case, the location of the user then proceeds to be updated to the backend so that the map 102 will show the user's non-real time location. If the current location of the user is determined to be inside of a privacy area PA, the server 200 will stop the subsequent update of the user's location on the map 102. Furthermore, the server 200 will remove the user's last known location which was displayed on the map 102. The server 200 can accordingly output a privacy signal to the user device 106 to notify the user such that they are aware that they are no longer online. When inside the privacy area geofence PA, the user's home page UI is updated to show that a privacy area PA is active and location updates are off. Thereby, the server 200 maintains user privacy and helps protect users should they return home or enter a given privacy area PA.

The server 200 may automatically start and/or stop location sharing on the map 102. The server 200 can determine a maximum time of sharing location based upon a preset time and/or the user's previous records of time spent at a particular location. Further, the server 200 may automatically determine a privacy area geofence PA, wherein upon entering the users will be automatically taken offline by the server 200. Such a privacy area PA can be a function of where the user spends a substantial amount of time, such as a residence, a work place, a local grocery store, café, etc., a preset radius therearound, a variable radius therearound based upon a particular day, a holiday, and/or time of day, a user inputted privacy area or calculated perimeter therearound, and/or location data or privacy areas PA of known friends and/or other users. The server 200 can also determine privacy areas PA based on certain businesses or areas, the bounds of which can be set by the businesses' known perimeters and/or wireless access points WAPs thereof. For example, the server 200 can identify grocery stores, department stores, government buildings, airports, etc., which may serve as de facto privacy areas.

Referring now to FIGS. 7-10, the server 200 can further generate and display feeds of user uploaded content on the map 102. The feeds, which can be image data, such as photos or videos, of users at given locations, allow users to interact with one another, based on a place in the real world, such as a park, gathering place where users are doing a given activity, a restaurant, a bar, etc., whether or not the users have presently matched with one another. Hence, the server 200 facilitates the grouping and interaction of users based on a particular location, so long as the users uploading content to the feed are within a feed area geofence FA. In other words, the ability to start and upload content to a given feed can be contingent upon being within the bounds of the feed area geofence FA. In one embodiment, the displaying of feeds may be contingent on users first being matched. In another embodiment, the feeds can be seen by users whether or not they have matched with the user uploading the user content in the feed.

The server 200, the users, and/or business owners can set a feed location or feed area FA and proximity thereof upon selecting a create new feed icon 704, positioning a feed pin or feed icon 702 on the map 102, and adjusting a size of the feed area geofence FA via a feed slider overlay 706. More particularly, a user may create a new feed by clicking on the new feed icon 704 overlayed onto the map 102. After clicking on the new feed icon 704, the server 200 will display a feed icon 702 and initial proximity area therearound on the map 102, and the user may specifically place the feed icon 702 by dragging the map 102 to a desired location relative to the stationary feed icon 702. Alternatively, it is conceivable that a user can input an address of a desired feed location. Thereafter, the user can adjust the size of the feed area geofence FA by sliding left or right on the slider overlay 706. The existing feeds can also be seen on the UI wherein users can add additional feeds. Once a desired location and size is selected, the user may input a corresponding command to finish adding the feed, and then the user device 106 will send the corresponding feed data to the server 200 for storage in the memory 210. Users may then click on the feed icon 702 and add and/or view user content as desired in a feed display. In one embodiment, the feed display is a separate GUI from the map 102. In another embodiment, the feed display is a feed overlay 708 on top of the map 102.

In one embodiment, the when the user presses the create feed icon, the server 200 conducts an API call to a remote map database, such as Google® places, to retrieve any and all registered businesses within the map area which the user is presently viewing. The server 200 may display a possible feed location overlay on the map 102. The possible feed location overlay is comprised of a listing of possible businesses, which thereby allows the user to select which business or location they wish to add to the map 102. The user selects from the list in the possible feed location overlay, or if the place is not listed the user can select an option to enter a custom name which is keyed to their chosen location. If a feed is already registered at the selected business, the server 200 notifies and prompts the user device 106 to post within the existing feed, and accordingly the user may join and post within the existing feed, but a new separate feed may not be created.

The server 200 can display existing feeds on the map 102. Users can select which feeds they wish to follow. Users may see the feeds of user content uploaded by users that are presently at that given location within the corresponding feed area geofence FA. Any user may view a given feed; however, only users that are at the location of the corresponding feed area can upload user content to the feed. Before creating and/or adding content to a feed, the server 200 can check whether or not the location of the user device 106 requesting to add a feed and/or upload to the feed is indeed within the feed area geofence FA. The server 200 can automatically prompt a user to create a feed and/or post within an existing feed, upon detecting that the user has entered a particular feed location geofence.

The server 200 can automatically refresh feeds based on a given time limit and/or based on the online/offline status of the user or users who uploaded the user content to the feed. Thereby, feeds can be relevant in both time and be an accurate depiction of who is presently at the feed location.

Figure 9:
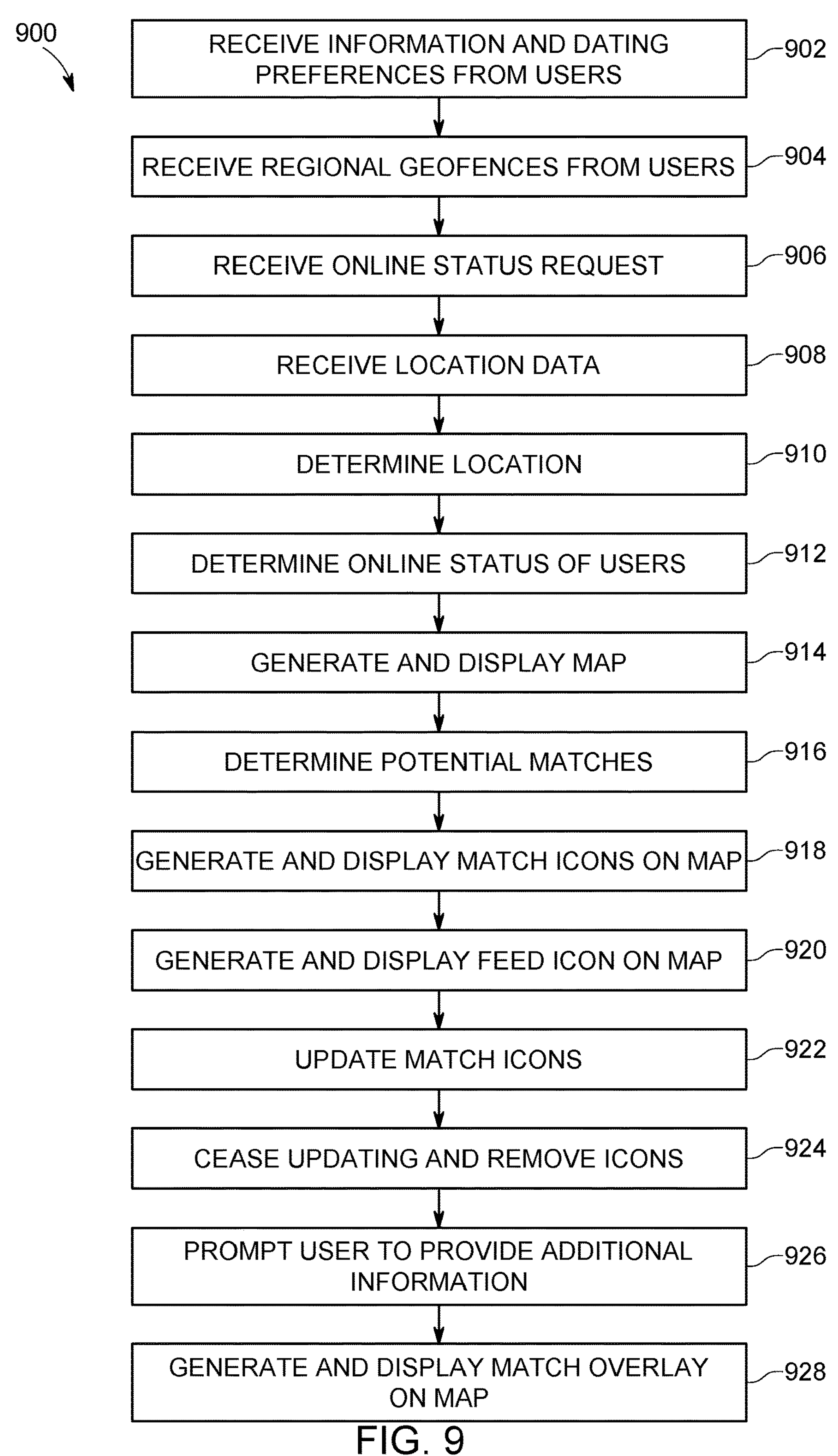
FIG. 9 is a flowchart of a method for generating an interactive map and connecting people via the map.

Referring now to FIG. 9, there is shown a flowchart of a method 900 for connecting people using the server 200, based on their preferences, interests, and non-real time location. Initially the server 200 can sign up users and receive the dating preferences of the users, along with other information users with to disclose about themselves (at block 902). Optionally, users can set user defined regional geofences which will be used to exclude potential matches outside of the regional geofences. Such regional geofences can be indicative of city, state, or country regions or the users can determine their own regional geofences based on a given proximity from their location. If inputted by the users, the server 200 will receive and store the user defined regional geofences (at block 904). Thus, the server 200 may only determine whether the users match if the user devices 106 of the users are within a given geofence or overlapping geofences. The server 200 can generate and display a status overlay displayed at the top of the map 102, which allows the users to toggle their online status between online or offline. Accordingly, the server 200 will receive an online status request based upon the user inputted command via the status overlay (at block 906). Location data from the user devices 106 will be sent to the server 200 at given intervals, and the server 200 will receive the location data (at block 908). The server 200 may then determine the location of the users based on the location data (at block 910). Therein, the server 200 can verify that the users are within a particular region and are not within a privacy area, such as their home, grocery store, or other location, which may have been inputted by the user or automatically determined by the server 200. The server 200 can determine the online status of the users and accordingly accept or reject the user's online status request based on user location data and any privacy area geofences (at block 912). Therein, if a given user is determined to be within a privacy area, the server 200 may hide their location if and when the user attempts to go online. The server 200 can generate and display the map 102 on the user devices 106 (at block 914). The server 200 can determine the user has any potential mates based on the dating preferences of the available users (at block 916). The server 200 may initially determine the location of the users and verify that the users are within the same or overlapping geofences. In one embodiment, the server 200 may only determine potential matches between users that are online and accordingly potentially visible on the map 102. In one embodiment, the server 200 determines potential matches between users that are online and users that are within privacy area geofences, except that the server 200 will accordingly hide the location of the users who are presently within their respective privacy area geofences PA.

Responsive to determining that one or more users match and that the matched user is online, the server 200 can generate and display on the interactive map 102 one or more match pins or icons indicative of the matched users whilst maintaining their privacy (at block 918). The server 200 can also generate and display feed pins or icons on the map 102.

Hence, the server 200 can populate the map 102 with the feed locations, of other users which may or may not have matched with a given user (at block 920). In one embodiment, the server 200 only populates the map 102 with feeds of businesses or other locations from users that specifically matched with the user. Optionally, the server 200 may output a match signal or a feed signal to the user devices 106 to notify the users of potential matches.

To keep the map 102 relevant and accurate, the server 200 can periodically update the match icons and feed icons. The server 200 can determine a unique location update time interval at which a location of the match icon of a user will be updated on the map 102 and accordingly update the match icon based on location data, the location update time interval, privacy area data, and the online status the user (at block 922). The server 200 can automatically cease updating and remove the match icon and/or feed icon associated with a given user (at block 924). For example, the server 200 can cease updating the location of a user upon determining that the user is traveling at a preset maximum speed or has remained stationary beyond a maximum online time limit. Additionally, for example, the server 200 can remove any feed icons, or feeds therein, upon determining that a particular user who uploaded user content in the feed has left the feed location or after a maximum online time limit associated with the user.

If a user sees a potential match on the map 102 and selects the corresponding match icon, then the server 200 can prompt the corresponding matched user to disclose additional information (at block 926). The server 200 can generate and display a corresponding match overlay (at block 928). Therein, the server 200 may first notify the selected user that another user has selected their match icon. The server 200 can prompt the second user to share their name and/or photo, or other additional information. The server 200 can receive a corresponding input command from the selected user to either share or not share the additional information. Based on the received input command from the selected user, the server 200 can generate and display on the interactive map 102 on the user device 106 of the other user either: an additional information overlay which displays the name and/or photo of the second user, or a hidden overlay which hides the name and/or photo of the second user. Thereafter, the server 200 may repeat any of the foregoing steps in any sequence as desired.

Figure 10:
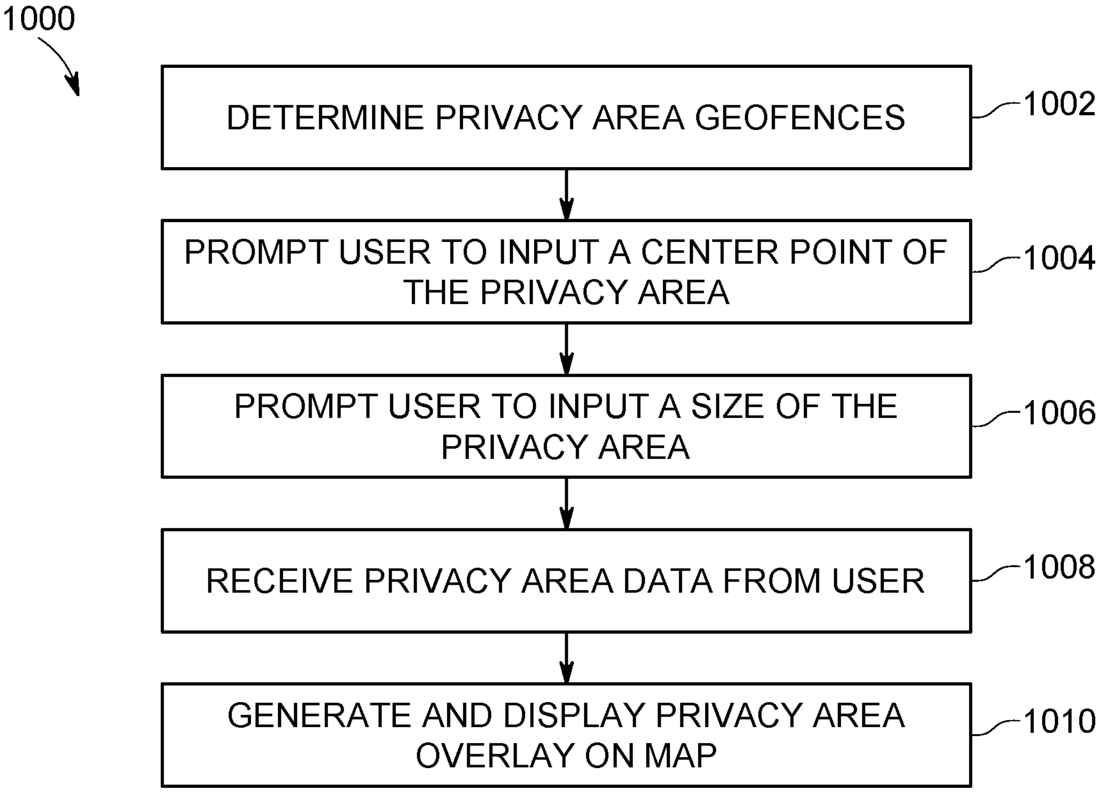
FIG. 10 is a flowchart of a method for generating privacy areas on the map.

Referring now to FIG. 10, there is shown a flowchart of a method 1000 for generating one or more privacy areas PA. The server 200 can determine one or more privacy area geofences PA based on user input, sensed user location data, and/or business or location data retrieved from a third party server 200 (at block 1002). In one embodiment, for example, the server 200 can initially prompt each user to input a center point of the privacy area geofence PA (at block 1004). The server 200 can then prompt each user to input a size of the privacy area geofence PA (at block 1006). Each user device 106 can then send the size and location of the privacy area geofence PA to the server 200, and accordingly the server 200 will receive this privacy area data and store such in the memory 210 (at block 1008). For each user that has inputted a privacy area geofence PA, the server 200 can display the privacy area geofence PA on the map 102 of that particular user's device 106 (at bock 1010). The privacy area overlay can include an overlay of a perimeter and/or an icon. Thereafter, the server 200 will use the privacy data in association with determining the users' online statuses and match icons. For example, after determining the privacy area geofences, the server 200 can determine whether each user is located within their respective privacy area geofence, and automatically switch the online status to an offline status upon each user entering their respective privacy area geofence as determined by the one or more processors 222.

In another embodiment, when determining the one or more privacy areas PA, at block 1002, the server 200 can automatically calculate, generate, and display privacy area geofences PA. Therein, the server 200 can automatically determine one or more privacy area geofences for each user based upon user input, location data of each user, residency data indicative of a home address of each user, and location or business data indicative of a place of work, a gym, a grocery store, a park, and/or a government building associated with each user. In some embodiments, after generating a privacy area geofence PA, the server 200 can prompt users to confirm the generated privacy area. The server 200 can notify users upon entering their privacy area, and may also notify users upon switching their status to an offline status. The server 200 can also prompt a user to go online up determining that the user device 106 of the user has exited the user's privacy area geofence PA.

Figure 11:
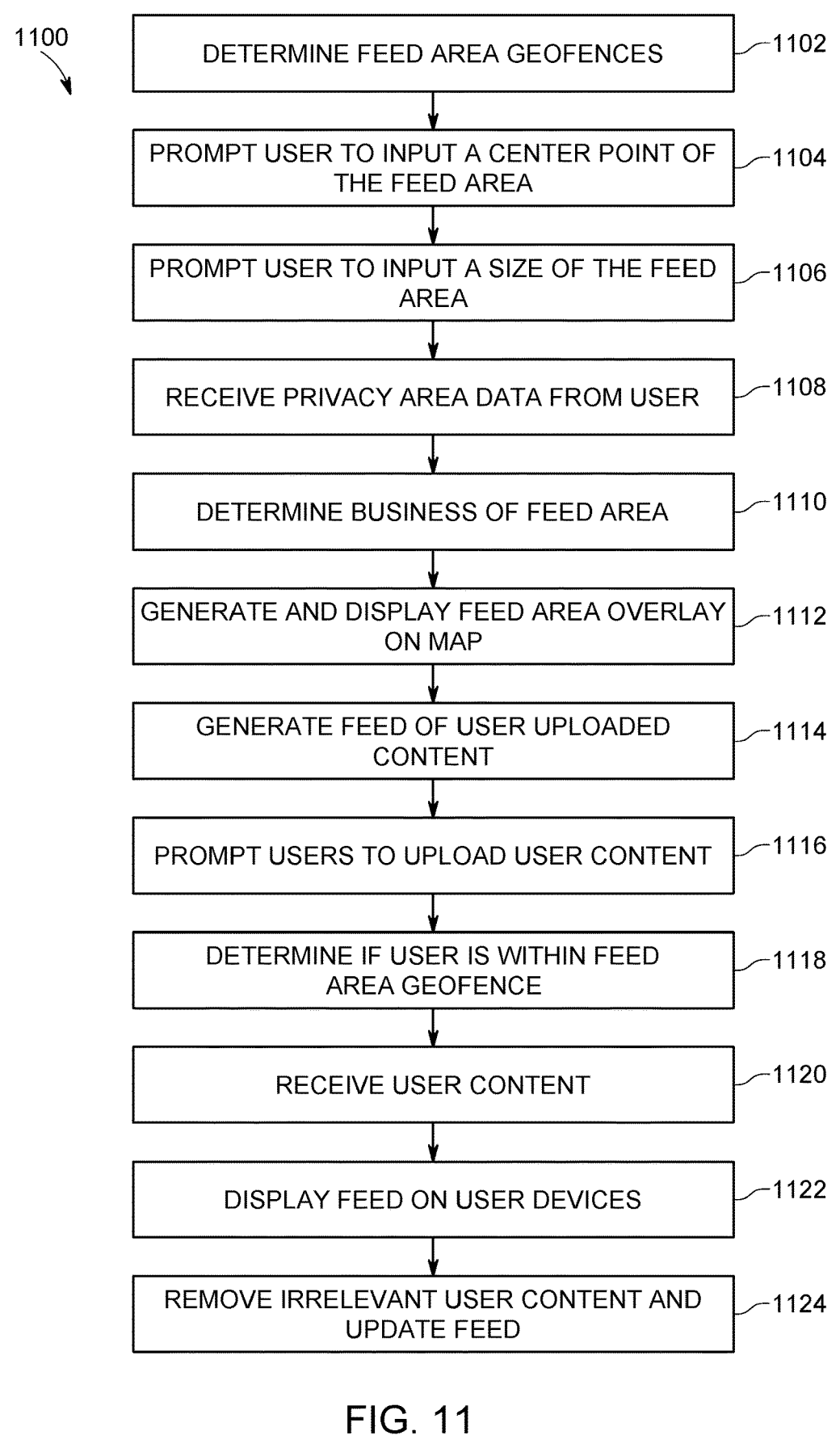

Referring now to FIG. 11, there is shown a flowchart of a method 1100 for connecting people through feeds associated with a particular location. The server 200 can generate a feed of user uploaded content which allows other users to view potential partners as they experience the real world. The server 200 can generate the feed based on user input, sensed user location data, and/or business or location data retrieved from a third party server 200. For example, the server 200 can determine a feed area geofence FA (at block 1102). In one embodiment, the server 200 can automatically determine the feed area geofence FA by sensing location data of the user and then matching location or business data from a third party server 200 with the location of the user, and thereafter determine the location, size, and shape of the feed area geofence FA based on the determined business. The server 200 can then prompt the user who is presently at this location to verify that the information determined by the server 200 is indeed correct.

In one embodiment, the server 200 requires user input to determine the feed location. For example, the server 200 can prompt each user to input a center point of a feed area geofence FA associated with the physical location at which the user is located (at block 1104). The server 200 can then prompt each user to input a size of the feed area geofence FA (at block 1106). The server 200 can then receive the inputted feed area data, including the inputted center point and size of the feed area geofence FA, from the user devices 106 (at bock 1108). The server 200 can also determine a business, or other organization, that is associated with the feed area geofence (at block 1110). The server 200 can generate and display a feed area overlay on the interactive map 102, which can indicate the location and size of the feed area associated with a particular location, such as a restaurant (at block 1112). The feed area overlay can include an overlay of a perimeter and/or an icon, such as the feed icon 702 and displayed feed area FA on the map 102. The feed icon may indicate a physical location at which a given user is located.

The server 200 can also generate a feed of user content uploaded by the users whilst they are located at the physical location, e.g., within the feed area geofence FA (at block 1114). Therein, the server 200 can prompt users to upload user content (at block 1116). The server 200 can determine whether the user wishing to upload user content is within the feed area geofence (at block 1118). Thereby, the server 200 can determine whether the user device 106 of a particular user is located within the feed area geofence FA before displaying the user content uploaded by the user such that the feed only contains the user content uploaded by users whilst they are located at the given business or other point of interest belonging to another organization or governmental body. The server 200 can then receive and store the user uploaded content, and add the user content to the feed (at block 1120). For example, the user can upload image data, e.g., photos, videos, and/or text, pertaining to the location and/or the user(s) at the location. The feed can be in the form of any desired feed, such as a scroll of image data. Upon selection of the feed icon by a user, the server 200 can display the feed on the user device 106 of the user (at block 1122). The server 200 can remove any irrelevant user content from the feed (at block 1124). For example, the server 200 can remove user content upon determining that a given user has left the physical location, e.g., exited the feed area geofence FA, is determined to be offline, and/or the content has been uploaded beyond a maximum time limit. Thereby, the feed may include only user content that is tethered to users who are presently at the location associated with the feed area geofence FA.

The steps of the methods described herein can be performed in any desired order. Other embodiments, which differ from the aforementioned embodiments, may be recognized by those skilled in the art without departing from the disclosure.

The invention claimed is:

1. A system comprising:

one or more memories storing computer executable instructions; and one or more processors that, when executing the computer executable instructions, are configured to:

receive one or more dating preferences associated with a first user;

receive location data of a first user device associated with the first user;

receive one or more dating preferences associated with a second user;

receive location data of a second user device associated with the second user;

receive an online status request from the second user;

generate and display an interactive map on the first user device;

receive map data from a map database;

determine whether the second user is relatively stationary at a physical location within a time interval;

automatically switch the online status to an offline status of the second user upon determining the second user is no longer relatively stationary, based on the map data and the time interval;

determine whether the first and the second users match based upon their dating preferences and their location data; and responsive to determining that the first and second users match, that the second user is at the physical location within the time interval, and further that the second user is online, generate and display on the interactive map a match icon of the second user, wherein the match icon of the second user is anonymous such that the match icon does not display personally identifiable information of the second user, maintaining the privacy of the second user, and wherein the match icon of the second user is indicative of a non-real time approximation of the second user, while being relatively stationary at the physical location within the time interval such that, upon matching, the first user cannot not know an exact real time location of the second user nor who the second user is outside of being a dating match, since the match icon is anonymous, thereby providing a dating experience wherein the first and second users meet organically in person.

2. The system of claim 1, wherein:

the match icon is configured to ensure that the exact real time location of the second user is not displayed on the interactive map or otherwise provided to the first user device of the first user nor to the one or more processors, in order to maintain the privacy of the second user.

3. The system of claim 1, wherein the one or more processors are further configured to:

determine a location update time interval at which a location of the match icon of the second user will be updated on the map; and updating the location of the second user based upon the location update time interval and the online status of the second user.

4. The system of claim 3, wherein the one or more processors are further configured to:

cease updating the location of the second user upon determining that the second user is traveling at a preset maximum speed or has remained stationary beyond a maximum online time limit.

5. The system of claim 3, wherein the one or more processors are further configured to:

wait for one location update time interval before displaying the match icon of the second user, upon the second user initially going online.

6. The system of claim 1, wherein the one or more processors are further configured to:

receive a user defined regional geofence from the first user; and determine that the second user device of the second user is within the user defined regional geofence, wherein the one or more processors are configured to only determine whether the first and the second users match if the second user device of the second user is within the user defined regional geofence.

7. The system of claim 1, wherein the one or more processors are further configured to:

determine a privacy area geofence associated with each user;

determine whether each user is located within their respective privacy area geofence; and automatically switch the online status to an offline status upon each user entering their respective privacy area geofence as determined by the one or more processors.

8. The system of claim 7, wherein in determining the privacy area geofence, the one or more processors are configured to:

prompt each user to input a center point of the privacy area geofence;

prompt each user to input a size of the privacy area geofence; and receive the inputted center point and size of the privacy area.

9. The system of claim 7, wherein the one or more processors are further configured to:

automatically determine one or more privacy area geofences for each user based upon user input, location data of each user, residency data indicative of a home address of each user, and business data indicative of a place of work, a gym, a grocery store, and/or a government building associated with each user.

10. The system of claim 7, wherein:

the one or more processors are configured to only determine whether the first and the second users match if the second user device of the second user is outside of the privacy area geofence associated with the second user.

11. The system of claim 1, wherein:

the match icon of the second user illustrates a non-real time location of the second user and a match likelihood between the first and second users.

12. The system of claim 11, wherein:

upon the first user selecting the match icon of the second user, the one or more processors are further configured to:

notify the second user that the first user has selected their match icon;

prompt the second user to share their name and/or photo;

receive a corresponding input command from the second user to either share or not share additional information; and based on the received input command from the second user, generate and display on the interactive map on the first user device of the first user either:

an additional information overlay which displays the name and/or photo of the second user; or a hidden overlay which hides the name and/or photo of the second user.

13. The system of claim 1, wherein the one or more processors are further configured to:

generate and display a feed icon on the interactive map, the feed icon indicating a physical location at which the second user is located;

generate a feed of user content uploaded by the second user whilst located at the physical location; and upon selection of the feed icon by the first user, display the feed on the first user device of the first user.

14. The system of claim 13, wherein the one or more processors are further configured to:

determine whether the second user device of the second user is located at the physical location of the feed icon to verify the physical location of the second user in real time before displaying the user content uploaded by the second user such that the feed being displayed is contingent upon the physical location of the second user in real time and only contains the user content uploaded by the second user whilst located at the physical location.

15. The system of claim 13, wherein the physical location at which the second user is located corresponds to a business or other public location and the one or more processors are further configured to:

remove the user content uploaded by the second user upon determining the second user has left the physical location.

16. The system of claim 13, wherein the one or more processors are further configured to:

prompt the second user to input a center point of a feed area geofence associated with the physical location at which the second user is located;

prompt the second user to input a size of the feed area geofence;

receive the inputted center point and size of the feed area geofence; and generate and display a feed area overlay on the interactive map of the first and second user devices of the first and second users.

17. The system of claim 13, wherein the one or more processors are further configured to:

determine a business associated with the physical location at which the second user is located;

determine a size and shape of a feed area geofence based on the determined business; and determine whether the second user device of the second user is located within the feed area geofence before displaying the user content uploaded by the second user such that the feed only contains the user content uploaded by the second user whilst located at the business.

18. A computer-implemented method comprising:

receiving one or more dating preferences associated with a first user;

receiving location data of a first user device associated with the first user;

receiving one or more dating preferences associated with a second user;

receiving location data of a second user device associated with the second user;

receiving map data from a map database;

receiving an online status request from the second user;

generating and displaying an interactive map on the first user device;

determining whether the second user is relatively stationary at a physical location within a time interval;

automatically switching the online status to an offline status of the second user upon determining the second user is no longer relatively stationary, based on the map data and the time interval;

determining whether the first and the second users match based upon their dating preferences and their location data;

and responsive to determining that the first and second users match, that the second user is at the physical location within the time interval, and further that and that the second user is online, generating and displaying on the interactive map a match icon of the second user, wherein the match icon of the second user is anonymous such that the match icon does not display personally identifiable information of the second user maintaining the privacy of the second user, and wherein the match icon of the second user is indicative of a non-real time approximation of the second user, while being relatively stationary at the physical location within the time interval, such that, upon matching, the first user cannot not know an exact real time location of the second user nor who the second user is outside of being a dating match, since the match icon is anonymous, thereby providing a dating experience wherein the first and second users meet organically in person.

19. A non-transitory computer-readable medium containing computer executable instructions that, when executed by one or more processors, cause the one or more processors to perform a method, the method comprising:

receiving one or more dating preferences associated with a first user;

receiving location data of a first user device associated with the first user;

receiving one or more dating preferences associated with a second user;

receiving location data of a second user device associated with the second user;

receiving map data from a map database;

receiving an online status request from the second user;

generating and displaying an interactive map on the first user device;

determining whether the second user is relatively stationary at a physical location within a time interval;

automatically switching the online status to an offline status of the second user upon determining the second user is no longer relatively stationary, based on the map data and the time interval;

determining whether the first and the second users match based upon their dating preferences and their location data; and responsive to determining that the first and second users match, that the second user is at the physical location within the time interval, and further that and that the second user is online, generating and displaying on the interactive map a match icon of the second user, wherein the match icon of the second user is anonymous such that the match icon does not display personally identifiable information of the second user, maintaining the privacy of the second user, and wherein the match icon of the second user is indicative of a non-real time approximation of the second user, while being relatively stationary at the physical location within the time interval, such that, upon matching the first user cannot not know an exact real time location of the second user nor who the second user is outside of being a dating match, since the match icon is anonymous, thereby providing a dating experience wherein the first and second users meet organically in person.

* * * * *